(12) United States Patent
Song et al.

(10) Patent No.: US 11,969,894 B2
(45) Date of Patent: Apr. 30, 2024

(54) APPARATUS FOR AUTOMATED COMMUNICATION BETWEEN ROBOT AND ARTIFICIAL INTELLIGENCE SERVICE AND METHOD USING THE SAME

(71) Applicant: Electronics and Telecommunications Research Institute, Daejeon (KR)

(72) Inventors: Byoung-Youl Song, Daejeon (KR); Choul-Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 419 days.

(21) Appl. No.: 17/484,672

(22) Filed: Sep. 24, 2021

(65) Prior Publication Data

US 2022/0402124 A1 Dec. 22, 2022

(30) Foreign Application Priority Data

Jun. 21, 2021 (KR) .......................... 10-2021-0079868

(51) Int. Cl.
*G06F 9/44* (2018.01)
*B25J 9/16* (2006.01)
(Continued)

(52) U.S. Cl.
CPC .......... *B25J 9/163* (2013.01); *G05B 13/0265* (2013.01); *G06F 9/45558* (2013.01); *G06F 9/546* (2013.01); *G06F 2009/45562* (2013.01)

(58) Field of Classification Search
CPC ....................................................... G06F 9/546
(Continued)

(56) References Cited

U.S. PATENT DOCUMENTS 9,886,272 B1 * 2/2018 Zhou .......................... G06F 8/76
2010/0094459 A1 * 4/2010 Cho ...................... G05D 1/0291
700/248
(Continued)

FOREIGN PATENT DOCUMENTS

CN 106933635 A 7/2017
KR 1020070061212 A 6/2007
(Continued)

OTHER PUBLICATIONS

Ki Woon Lee et al., "Bridge for Exchange of Data and Service Invocation Between OPRoS and ROS," Journal of Institute of Control, Robotics and Systems, Feb. 28, 2016.
(Continued)

*Primary Examiner* — Timothy A Mudrick
(74) *Attorney, Agent, or Firm* — William Park & Associates Ltd.

(57) ABSTRACT

Disclosed herein are an apparatus for automated communication between a robot and an artificial intelligence service. The method for automated communication between a robot and an artificial intelligence service is performed by an apparatus for automated communication between the robot and the artificial intelligence service, and includes generating bridge code and a container definition file based on a mapping rule defined between the robot and the artificial intelligence service, running a bridge container having an independent format based on the container definition file, executing the bridge code through the bridge container, and providing an automated communication environment by exchanging a message between the robot and the artificial intelligence service based on the bridge code.

18 Claims, 12 Drawing Sheets

(51) Int. Cl.
  *G05B 13/02* (2006.01)
  *G06F 9/455* (2018.01)
  *G06F 9/54* (2006.01)

(58) Field of Classification Search
  USPC ........................................................ 719/313
  See application file for complete search history.

(56) References Cited

U.S. PATENT DOCUMENTS

2011/0153075 A1   6/2011  Kim et al.
2021/0349943 A1*  11/2021 Aksu ....................... G06F 16/75

FOREIGN PATENT DOCUMENTS

KR   1020190059002 A   5/2019
KR   1020210012400 A   2/2021

OTHER PUBLICATIONS

Minho Lee et al., "A Relay System for Supporting the Execution of Context-Aware Robot Services on ROS," KIPS Tr. Comp. and Comm. Sys., vol. 6, No. 5, May 31, 2017, pp. 211~218, pISSN: 2287-5891.

* cited by examiner

```
bind_types: ros2rest                          — 410
topics:                                       — 400
    - name: "my_request_topic"
      type: my_pkg.msg.ThreeNum,
      path: ./my_pkg/ThreeNum.msg             — 420
    - name: "my_response_topic"
      type: me_pkg.msg.Num
      path: ./me_pkg/Num.msg
apis:
    - url: {addNum}/process/{param_id}        — 440 request:                                — 441
          header_params:
              - name: API-KEY
                from : {ServiceClientSecret}  — 450
          path_params:
              - name: param_id
                from: "30"                    — 451
                                              — 430
          data_params:
              - name: "first"
                from: my_request_topic.b      — 452
              - name: "second"
                from: my_request_topic.c respones:
          - topic: "my_respones_topic"        — 460
          returns:
              - name: num                     — 442
                from: result                  — 461
              - name: time
                from: datetime
```

FIG. 4

POST https://someapi.com/process/{param_id}  ~510

REQUEST HEADER

| PARAMETER NAME | DESCRIPTION |
|---|---|
| API-KEY | SERVICE CLIENT SECRET |

~520

REQUEST BODY

| PARAMETER NAME | DESCRIPTION |
|---|---|
| FIRST | NUMBER STRING |
| SECOND | NUMBER STRING |

~530

RESPONSE

| PARAMETER NAME | DESCRIPTION |
|---|---|
| RESULT | CALCULATION RESULT |
| DATETIME | TIME TO FINISH THE CALCULATION |

ROBOT DEVICE MESSAGE   610

| MESSAGE INFORMATION | CONTENTS |
|---|---|
| TOPIC NAME | my_request_topic |
| TOPIC TYPE | my_pkg.msg.ThreeNum |
| TOPIC TYPE FORMAT | my_pkg/ThreeNum.msg |

611

```
int64 a
int64 b
int64 c
```
ThreeNum.msg

```
cmake_minimum_required(VERSION 3.5)
project(me_pkg)
find_package(ament_cmake REQUIRED)
find_package(rosid_default_generators REQUIRED)

rosidl_generate_interfaces(${PROJECT_NAME}
msg/Num.msg
)
ament_package()
```

```xml
<?xml version="1.0"?>
<?xml-model href="http://download.ros.org/schema/package_format3.xsd" schematypens="http://www.w3.org/2001/XMLSchema"?>
<package format="3">
  <name>me_pkg</name>
  <version>0.0.0</version>
  <description>TODO : Package description</description>
  <maintainer email="user@todo.todo">user</maintainer>
  <license>TODO : License desclaration</license>

<buildtool_depend>ament_cmake</buildtool_depend>
  <build_depend>rosidl_default_generators</build_depend>
  <exec_depend>rosidl_default_runtime</exec_depend>
  <member_of_groud>rosidl_interface_packages</member_of_group>

<test_depend>ament_lint_auto</test_depend>
  <test_depend>ament_lint_common</test_depend>

<export>
    <build_type>ament_cmake</build_type>
  </export>
</package>
```

FIG. 10

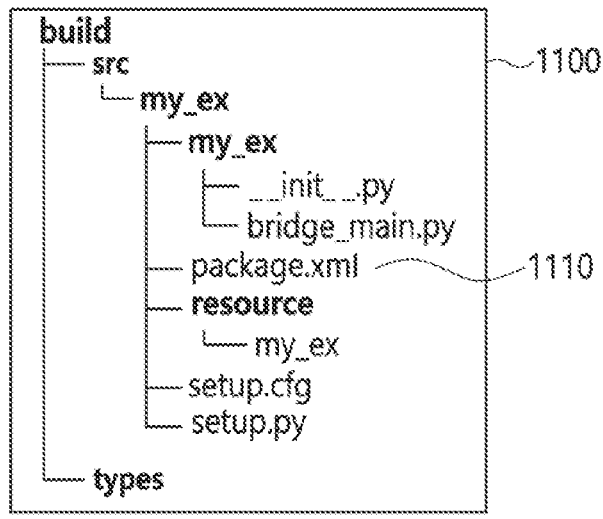

FIG. 11

```
<?xml version="1.0"?>
<?xml-model href="http://download.ros.org/schema/package_format3.xsd" schematypens="http://www.w3.org/2001/XMLSchema"?>
<package format="3">
   <name><me_ex</name>
   <version>0.0.0</version>
   <description>TODO : Package description</description>
   <maintainer email="user@todo.todo">user</maintainer>
   <license>TODO : License desclaration</license>

<exec_depend>rdpy</exec_depend>
   <exec_depend>my_pkg</exec_depend>
   <exec_depend>me_pkg</exec_depend>
   <exec_depend>my_pkg</exec_depend>
   <exec_depend>me_pkg</exec_depend>

<export>
      <build_type>ament_python</build_type>
   </export>
</package>
```

```
class srv_1_BridgeClass:
    def __init__(self, node):
        self.node = node                                                    ~1300 self.subscription_1 = node.create_subscription(
            my_pkg.msg.ThreeNum, 'my_request_topic',                        ~1310
            self.listener_callback_1, qos_profile_system_default)

self.publisher_1 = node.create_publisher(
            me_pkg.msg.Num, 'my_response_topic',                            ~1320
            qos_profile_system_default)

def listener_callback_1(self, msg):
        pathparam={}
        pathparam[ 'addaNum' ] = get_value('addNum')                        ~1331
        pathparam[ 'param_id' ] = '30'
                                                                            ~1330
        dataparam = {}
        dataparam[ 'first' ] = msg.b
        dataparam[ 'second' ] = msg.c                                       ~1332 params = bytes(json.dumps(dataparam).encode('utf-8'))

ur1='http://'+'{addNum}/process/{param_id}'
                                                                            ~1333
        req = urllib.request.Request(ur1=ur1.format(**pathparam),
            data =params, method='POST' )

req.add_header('Content-Type', 'application.json, charset=UTF-8')   ~1334
        req.add_header('API-KEY', get_value('ServiceClientSecret'))

with urllib.request.urlopen(req) as resp:
            resp_date = json.loads(resp.read().decode('utf-8'))
            outDate = new me_pkg.msg.Num( )                                 ~1340
            outDate.num = resp_data["result"]
            dutDate.time = resp_date["datetime"]
            self.publisher_1.publish(oetDate)
```

FROM ros : foxy-ros-base as rose2_base

COPY build /root/build  ~1410

WORKDIR /root/build

RUN /bin/bash -c 'source /opt/ros/foxy/setup.bash && colcon build'  ~1420

CMD exec / bin/bash -c 'source /root/build/install/setup.bash && ros2 run my_ex ros_aigw'  ~1430
```

FIG. 14

APPARATUS FOR AUTOMATED COMMUNICATION BETWEEN ROBOT AND ARTIFICIAL INTELLIGENCE SERVICE AND METHOD USING THE SAME

CROSS REFERENCE TO RELATED APPLICATION

This application claims the benefit of Korean Patent Application No. 10-2021-0079868, filed Jun. 21, 2021, which is hereby incorporated by reference in its entirety into this application.

BACKGROUND OF THE INVENTION

1. Technical Field

The present invention relates generally to technology for automated communication between a robot and an Artificial Intelligence (AI) service, and more particularly to technology for automating a communication configuration between a robot-specific framework-based robot application software module and an AI service that is provided in the form of a web service so as to utilize the AI service with a robot, which provides services by fusing various AI technologies.

2. Description of the Related Art

A robot may provide services by fusing various artificial intelligence functions based on various types of sensor information collected or generated from devices or sensors embedded in the robot. For example, artificial intelligence-based functions, such as speech recognition, natural language processing, object recognition, user recognition, action recognition, appearance feature recognition, location recognition, movement path generation, joint trajectory generation, and robot manipulation information generation, may be fused and provided.

Performance of recent artificial intelligence modules has been greatly improved with the development of Artificial Neural Network (ANN)-based machine learning, and more and more neural network-based artificial intelligence modules have been released.

Recently, there are many cases where neural network-based artificial intelligence modules are configured using various artificial intelligence frameworks such as Tensor-Flow, PyTorch, and Keras, and various external packages required for artificial intelligence algorithms so as to develop artificial intelligence algorithms. Also, the higher the performance of artificial intelligence, the more resources are required. Therefore, there are many occasions when an artificial intelligence service is provided in the form of a REpresentational State Transfer (REST)-based web service in a cloud computing environment in which high performance can be provided, rather than in the form of a service provided by embedding an artificial intelligence algorithm in a robot having relatively low computing power.

In this case, in order for the robot to utilize an artificial intelligence service provided in the form of a web service, a separate application module that extracts data from a device information message delivered in the form of a dedicated protocol, calls a web-based artificial intelligence service, and sends the result of the service call as an event message is required. Such an application module is inconvenient in that a developer must personally run the corresponding module through hard coding.

That is, a problem arises in that a developer must perform hard coding to configure a software module each time depending on a message used in a robot-specific protocol, Uniform Resource Locator (URL) information of the artificial intelligence service to be used, or parameters.

PRIOR ART DOCUMENTS

Patent Documents (Patent Document 1) Korean Patent Application Publication No. 10-2021-0012400, Date of Publication: Feb. 3, 2021 (Title: Method of Building Backend with Automatic Programming Code Generation)

SUMMARY OF THE INVENTION

Accordingly, the present invention has been made keeping in mind the above problems occurring in the prior art, and an object of the present invention is to automate a communication configuration between an artificial intelligence service provided in the form of a web service and robot application software using a dedicated protocol, without causing a robot AI developer or a robot application software developer to develop separate code, merely by establishing a simple mapping rule between a device information message from a robot and a web service parameter.

Another object of the present invention is to provide a scheme for configuring communication between a robot and an artificial intelligence service at low costs even when variation occurs in a robot driving environment or a robot development environment.

In accordance with an aspect of the present invention to accomplish the above objects, there is provided a method for automated communication between a robot and an artificial intelligence service, the method being performed by an apparatus for automated communication between the robot and the artificial intelligence service, the method including generating bridge code and a container definition file based on a mapping rule defined between the robot and the artificial intelligence service; running a bridge container having an independent format based on the container definition file; executing the bridge code through the bridge container; and providing an automated communication environment by exchanging a message between the robot and the artificial intelligence service based on the bridge code.

The bridge code may generate a service request message to be sent to the artificial intelligence service in accordance with a service requested by a robot device message, and may generate a robot event message to be sent to the robot based on a service result message received from the artificial intelligence service.

The mapping rule may be established in consideration of Robot Operating System (ROS)-based robot application software message information and web-based artificial intelligence service information.

The robot application software message information may include message configuration information and a data structure definition file, and the artificial intelligence service information may include service path information, request header parameter information, request body parameter information, and response information.

The mapping rule may include a mapping type setup area, a utilization target topic setup area, and a service mapping rule area.

Generating the bridge code may include acquiring a data type package corresponding to a topic included in the utilization target topic setup area by parsing the mapping rule; generating a bridge code package profile by setting the data type package to execution-dependency package information; and generating a bridge code block corresponding to the bridge code based on the bridge code package profile.

The bridge code block may perform message exchange between the robot and the artificial intelligence service based on a topic reception module setup function, a topic transmission module setup function, a message-processing callback function, and a robot event message configuration function.

Running the bridge container may include building a container image by inputting the container definition file to a Docker based on a container build tool; and requesting running of the bridge container by executing the built container image.

The container definition file may be generated by inputting the mapping rule to the container build tool, and may include an environment for compiling and executing the bridge code, together with the bridge code.

In accordance with another aspect of the present invention to accomplish the above objects, there is provided an apparatus for automated communication between a robot and an artificial intelligence service, including a processor for generating bridge code and a container definition file based on a mapping rule defined between the robot and the artificial intelligence service, running a bridge container having an independent format based on the container definition file, executing the bridge code through the bridge container, and providing an automated communication environment by exchanging a message between the robot and the artificial intelligence service based on the bridge code; and memory for storing the mapping rule.

The bridge code may generate a service request message to be sent to the artificial intelligence service in accordance with a service requested by a robot device message, and may generate a robot event message to be sent to the robot based on a service result message received from the artificial intelligence service.

The mapping rule may be established in consideration of Robot Operating System (ROS)-based robot application software message information and web-based artificial intelligence service information.

The robot application software message information may include message configuration information and a data structure definition file, and the artificial intelligence service information may include service path information, request header parameter information, request body parameter information, and response information.

The mapping rule may include a mapping type setup area, a utilization target topic setup area, and a service mapping rule area.

The processor may acquire a data type package corresponding to a topic included in the utilization target topic setup area by parsing the mapping rule, generate a bridge code package profile by setting the data type package to execution-dependency package information, and generate a bridge code block corresponding to the bridge code based on the bridge code package profile.

The bridge code block may perform message exchange between the robot and the artificial intelligence service based on a topic reception module setup function, a topic transmission module setup function, a message-processing callback function, and a robot event message configuration function.

The processor may build a container image by inputting the container definition file to a Docker based on a container build tool, and may request running of the bridge container by executing the built container image.

The container definition file may be generated by inputting the mapping rule to the container build tool, and includes an environment for compiling and executing the bridge code, together with the bridge code.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram illustrating an example of a mapping rule according to the present invention;

FIG. 5 is a diagram illustrating an example of web-based artificial intelligence service information according to the present invention;

FIGS. 6 and 7 are diagrams illustrating examples of robot application software message information according to the present invention;

FIGS. 8 to 10 are diagrams illustrating examples of a data type package build script and a data type package profile according to the present invention;

FIGS. 11 and 12 are diagrams illustrating examples of a bridge code package build script and a bridge code package profile according to the present invention;

FIG. 13 is a diagram illustrating an example of a bridge code block according to the present invention;

FIG. 14 is a diagram illustrating an example of a container definition file according to the present invention;

DESCRIPTION OF THE PREFERRED EMBODIMENTS

Figure 1:
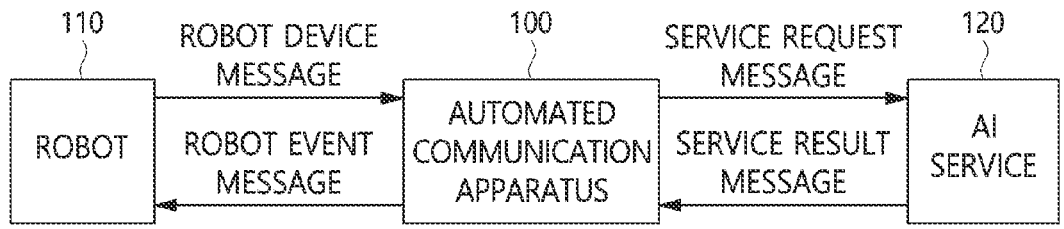
FIG. 1 is a diagram illustrating a system for automated communication between a robot and an artificial intelligence service according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram illustrating a system for automated communication between a robot and an artificial intelligence service according to an embodiment of the present invention.

Referring to FIG. 1, the system for automated communication between a robot and an artificial intelligence service according to the embodiment of the present invention may include an automated communication apparatus 100, a robot 110 which uses a dedicated protocol, and a web-based artificial intelligence service 120.

The robot 110 may be a robot software module.

The automated communication apparatus 100 generates a bridge code and a container-definition file based on a mapping rule that is defined between the robot 110 and the artificial intelligence service 120.

Here, the mapping rule may be established in consideration of Robot Operating System (ROS)-based robot application software message information and web-based artificial intelligence service information.

Here, the robot application software message information may include message configuration information and a data structure definition file, and the artificial intelligence service information may include service path information, request header parameter information, request body parameter information, and response information.

Here, the mapping rule may include a mapping type setup area, a utilization target topic setup area, and a service mapping rule area.

Here, a data type package corresponding to a topic included in the utilization target topic setup area may be acquired by parsing the mapping rule, a bridge code package profile may be generated by setting the data type package to execution-dependency package information, and a bridge code block corresponding to the bridge code may be generated based on the bridge code package profile.

Also, the automated communication apparatus 100 runs a bridge container having an independent format based on a container definition file.

In this case, the container image may be built by inputting the container definition file to a Docker based on a container build tool, and running of the bridge container may be requested by executing the built container image.

Here, the container definition file may be generated by inputting the mapping rule to the container build tool, and may include a bridge code together with the environment for compiling and executing the bridge code.

Further, the automated communication apparatus 100 executes the bridge code through the bridge container.

Furthermore, the automated communication apparatus 100 provides an automated communication environment by exchanging messages between the robot 110 and the artificial intelligence service 120 based on the bridge code.

In this case, the bridge code may generate a service request message to be sent to the artificial intelligence service 120 in accordance with a service requested by a robot device message, and may generate a robot event message to be sent to the robot 110 based on a service result message received from the artificial intelligence service 120.

Here, the bridge code block may perform message exchange between the robot 110 and the artificial intelligence service 120 based on a topic reception module setup function, a topic transmission module setup function, a message-processing callback function, and a robot event message configuration function.

Figure 2:
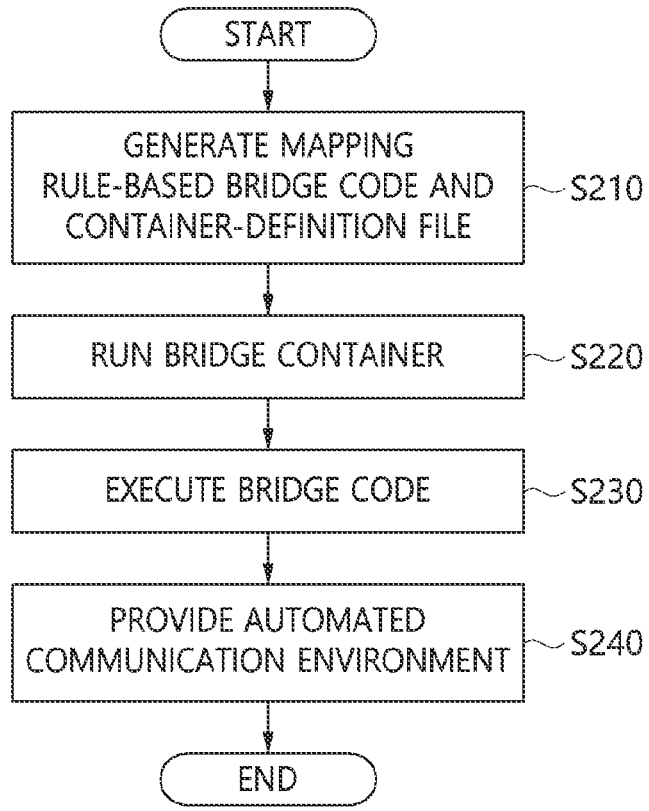
FIG. 2 is an operation flowchart illustrating a method for automated communication between a robot and an artificial intelligence service according to an embodiment of the present invention.

FIG. 2 is an operation flowchart illustrating a method for automated communication between a robot and an artificial intelligence service according to an embodiment of the present invention.

Referring to FIG. 2, in the method for automated communication between the robot and the artificial intelligence service according to the embodiment of the present invention, an apparatus for automated communication between the robot and the artificial intelligence service generates bridge code and a container definition file based on a mapping rule defined between the robot and the artificial intelligence service at step S210.

Here, the mapping rule may be established in consideration of Robot Operating System (ROS)-based robot application software message information and web-based artificial intelligence service information.

Figure 3:
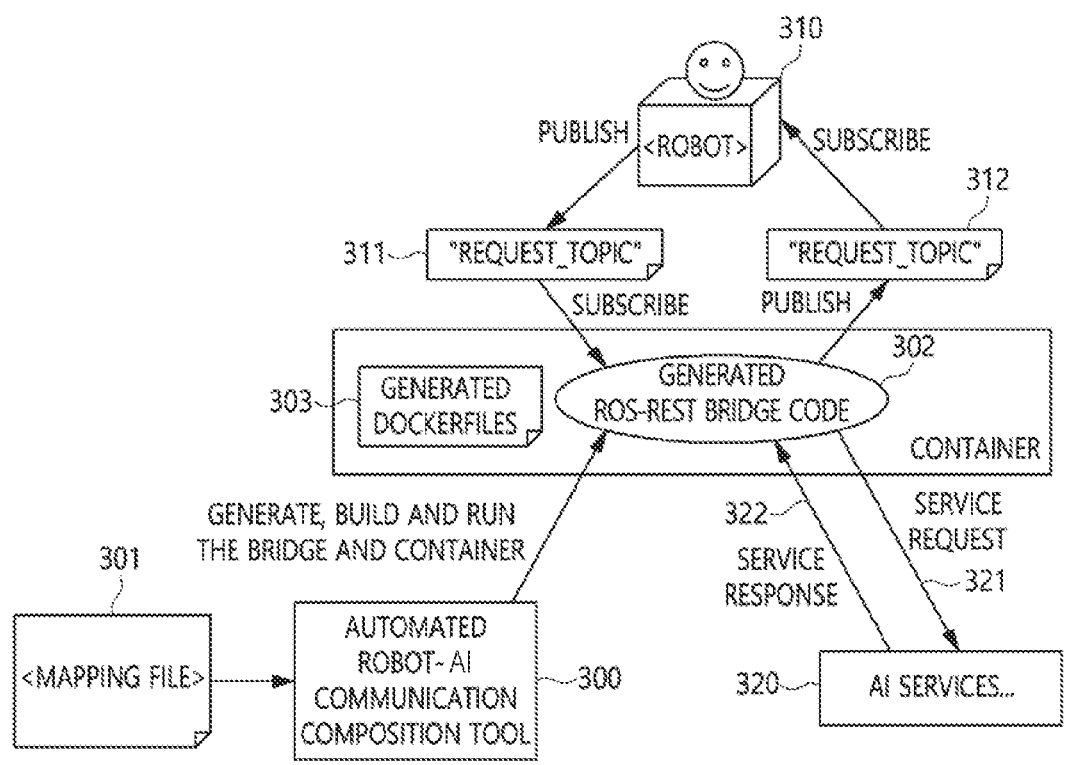
FIG. 3 is a diagram illustrating in detail a process for automated communication between a robot and an artificial intelligence service according to an embodiment of the present invention.

For example, referring to the system for automated communication between a robot and an artificial intelligence service according to an embodiment of the present invention, illustrated in FIG. 3, the mapping rule file (mapping file) 301 may be generated in consideration of artificial intelligence service information, acquired from the provider of an artificial intelligence service 320, and robot application software message information for a robot 310.

Here, the mapping rule may include a mapping type setup area, a utilization target topic setup area, and a service mapping rule area.

For example, referring to FIG. 4, a mapping rule 400 according to an embodiment of the present invention may be typically represented by the form of "name (key): value", and may be established using a file format that is capable of representing a structure such as YAML, XML, or JSON, as a creation format.

The mapping type setup area 410 is configured to set the type value to be applied to the corresponding mapping rule, and may use a combination of the values of ROS, Message Queue Telemetry Transport (MQTT), REST, Data Distribution Service (DDS), and gRPC.

For example, referring to the mapping type setup area 410 illustrated in FIG. 4, "ros2rest", which is a value signifying a mapping rule between ROS and REST, may be set in "bind_types", which is the name (key) of the mapping type setup field.

The utilization target topic setup area 420 may include information about a robot device message and a robot event message which are utilized in the corresponding mapping rule.

For example, referring to FIG. 4, in "topics" which is the name (key) of the field corresponding to the utilization target topic setup area 420, values indicating respective message topics may be set in corresponding "name" fields. Also, the data type used by each message may be set in the "type" field, and the location of a definition file for each data type may be set in the "path" field.

In the service mapping rule area 430, for each target artificial intelligence service to which the mapping rule is to be applied, an artificial intelligence service access path 440, a mapping rule 441 for each component of a service request message, and a mapping rule 442 for each component of a robot event message required to deliver the results of the request for the artificial intelligence service to the robot, may be established.

The artificial intelligence service access path 440 may be represented using a system variable having the format of "${variable value}" so as to determine the address of a host which provides an artificial intelligence service provided in a REST style during system operation.

The mapping rule 441 for each component of the service request message may be composed of a mapping rule 450 for a header component of the service request message, a mapping rule 451 for a request path thereof, and a mapping rule 452 for message data thereof.

The mapping rule 442 for each component of the robot event message may be composed of a target topic 460 and a target topic mapping rule 461 for each component of the corresponding topic data, with respect to each robot event message to be configured from the results of the request for the artificial intelligence service.

Here, in respective mapping rules included in the mapping rule 441 for each component of the service request message and the mapping rule 442 for each component of the robot event message, constants, variables, regular expressions, etc., which exploit a character string, may be utilized.

Below, the mapping rule 441 for each component of a service request message is described with reference to FIG. 4. That is, in the mapping rule 450 for the header component of the service request message, "API-KEY" may be set in a name field for setting the name of a target variable to be inserted into the HTTP header of the service request message, and may be set to a system variable value (e.g., $ServiceClientSecret) so as to determine the corresponding value during system operation.

Here, in order to represent a field value corresponding to "name" of the mapping rule 451 for the request path, the field value may be set to a URL-format character string in which the character string "${variable value}" is included. In this case, the character string used in the variable name "name" in the mapping rule 451 for the request path may correspond to the variable used in the artificial intelligence service access path 440. In FIG. 4, "name" corresponding to the variable "${param_id}" of the artificial intelligence service access path 440 is set to "param_id", and the corresponding value of the variable may be set to "30".

In this case, in the mapping rule 452 for the message data, each parameter forming the message body 530 of the service request message, as shown in FIG. 5, may be set in the "name" field, and a rule for fetching the corresponding value may be set in the "from" field. Referring to FIGS. 4 and 5, it can be seen that the value of the parameter "first" in the message body 530 is set to the component "b" of the robot device message, and the value of the parameter "second" of the message body 530 is set to the component "C" of the robot device message.

Figures 7, 8:
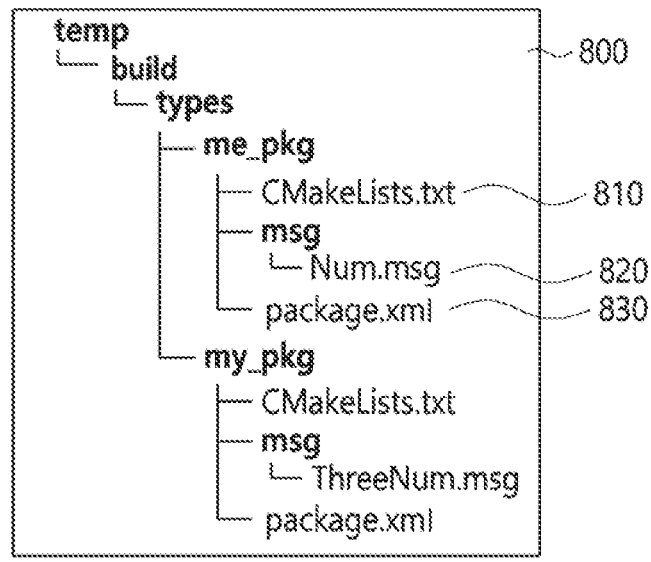

Further, the mapping rule 442 for each component of the robot event message is described with reference to FIG. 4. That is, the target topic 460 of the robot event message to be delivered to the robot may be set based on the results of the request for the artificial intelligence service, and a target topic mapping rule 461 for configuring each component of the corresponding topic may be set in the "returns" field. Referring to FIGS. 4, 5, and 7, the target topic 460 is set to "my_response_topic", "num" among the components 711 of the corresponding topic is set to the parameter value "result", among the values of the response result 540 of the artificial intelligence service, and "time" is set to the parameter value "datetime", among the values of the response result 540.

Here, the container definition file may be generated by inputting the mapping rule to the container build tool, and may include bridge code, together with the environment for compiling and executing the bridge code.

For example, referring to FIG. 3, the mapping rule file (mapping file) 301 may be input to an automated robot-AI communication composition tool 300 corresponding to the automated communication apparatus according to the embodiment of the present invention, and then a container definition file (generated Dockerfiles) 303 that includes both bridge code corresponding to the mapping rule (generated ROS-REST bridge code 302) and the environment for compiling and executing the bridge code may be generated.

Figure 15:
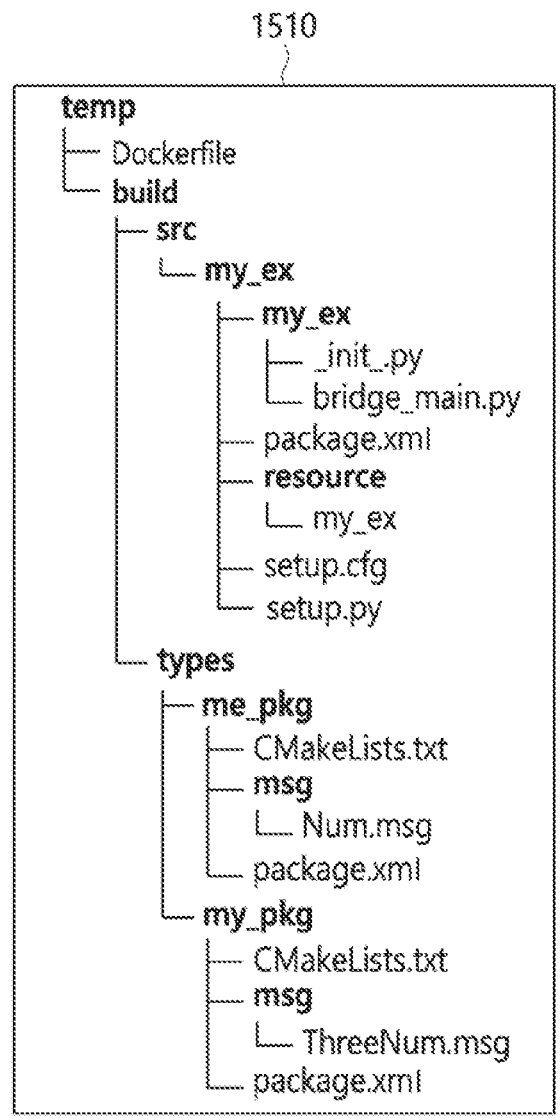
FIG. 15 is a diagram illustrating an example of a finally generated temporary storage directory according to the present invention.

Further, referring to FIGS. 14 and 15, a container definition file 1400 may include a command 1410 for adding the structure of a temporary storage directory 1510, in which bridge code and data type package configuration code are included, to a container image, a compile command 1420 for compiling the data package configuration code and the bridge code, and a command 1430 for automatically executing the bridge code upon executing the bridge container.

Here, a data type package corresponding to a topic included in the utilization target topic setup area may be acquired by parsing the mapping rule.

For example, the automated robot-AI communication composition tool 300 illustrated in FIG. 3 may parse the mapping rule using a YAML loader or an XML loader depending on the file format of the mapping file 301, and may set up the temporary storage directory in which the bridge code 302 to be generated, type data, and container code are to be stored based on the mapping rule.

Here, settings for respective topics, which are set in the utilization target topic setup area, may be acquired by parsing the mapping rule file (mapping file) 301.

Thereafter, the name of a data type package and the location of a data type definition file may be acquired from the acquired settings, and then the data type definition file may be copied and stored accordance with a data type package directory structure.

For example, referring to FIG. 8, a data type definition file 820 may be copied to and stored in the type data setup path (e.g., temp/build/types) of a temporary storage directory (e.g., temp) in accordance with a data type package directory structure 800. In this case, a data type package build script 810 or 910 and a data type package profile 830 or 1010 for compiling the data type packages may be generated and stored.

Thereafter, in the temporary storage directory (e.g., temp), the directory (e.g., /temp/build/src) in which the bridge code is to be stored may be set up in accordance with a bridge code directory structure 1100 such as that shown in FIG. 11, and optional files for respective code languages required to execute the bridge code (in the case of python, setup.cfg, setup.py, _init_.py) may be generated.

Here, the bridge code package profile may be generated by setting the data type package to execution-dependency package information.

For example, referring to FIGS. 11 and 12, a bridge code package profile 1110 or 1210 in which data type packages for respective topics included in the utilization target topic setup area are set to execution-dependency package information 1211 may be generated.

Based on the bridge code package profile, a bridge code block corresponding to the bridge code may be generated.

The bridge code block will be described in detail later with reference to FIG. 13.

Meanwhile, artificial intelligence service information may include service path information, request header parameter information, request body parameter information, and response information.

In this case, it may be assumed that service path information 510, request header parameter information 520, request body parameter information 530, and response information 540 for open or well-known artificial intelligence services, such as those shown in FIG. 5, are provided in advance and made known by corresponding artificial intelligence service providers.

Meanwhile, robot application software message information may include message configuration information and a data structure definition file.

Here, it may be assumed that the configuration information 610 of the robot device message, such as that shown in FIG. 6, that is received from the sensor, actuator, or the like of the robot, and the data structure definition file 611 of the robot device message, are known in advance. Further, it may be assumed that the configuration information 710 of a robot event message, such as that shown in FIG. 7, that is utilized to determine the behavior of the robot as the results of a request for an artificial intelligence service, and the data structure definition file 711 of the robot event message, are known in advance.

Further, in the method for automated communication between the robot and the artificial intelligence service according to the embodiment of the present invention, the apparatus for automated communication between the robot and the artificial intelligence service runs a bridge container having an independent format based on the container definition file at step S220.

Here, a container image may be built by inputting the container definition file to a Docker based on a container build tool.

The built container image may be executed, and thus running of the bridge container may be requested.

In an example, referring to FIG. 3, the automated robot-AI communication composition tool 300 may create the container image from the container definition file 303 by executing a Docker BUILD command.

Thereafter, the bridge container including the bridge code 302 may run by executing a Docker RUN command.

For example, whether an error has occurred in building the container image may be checked. If it is determined that an error has not occurred, running of the bridge container may be requested by inputting the name of the image used to build the container image.

Next, in the method for automated communication between the robot and the artificial intelligence service according to the embodiment of the present invention, the apparatus for automated communication between the robot and the artificial intelligence service executes the bridge code through the bridge container at step S230.

Then, in the method for automated communication between the robot and the artificial intelligence service according to the embodiment of the present invention, the apparatus for automated communication between the robot and the artificial intelligence service provides an automated communication environment by exchanging messages between the robot and the artificial intelligence service based on the bridge code at step S240.

In this case, the bridge code may generate a service request message to be sent to the artificial intelligence service in accordance with the service requested by the robot device message, and may generate a robot event message to be sent to the robot based on a service result message received from the artificial intelligence service.

For example, referring to FIG. 3, the bridge container running in the form of an independent container may receive a robot device message 311 delivered in the form of a robot-specific protocol (ROS) from the robot 310, convert the robot device message 311 into a service request message 321 to be sent to the artificial intelligence service, and then call an artificial intelligence service 320. Thereafter, when a service result message 322 is received from the artificial intelligence service 320, the bridge container may configure content of the received service result message 322 in the form of a robot event message 312 based on a mapping rule, and may thereafter deliver the robot event message 312 to the robot 310.

Meanwhile, the bridge code block may perform message exchange between the robot and the artificial intelligence service based on a topic reception module setup function, a topic transmission module setup function, a message-processing callback function, and a robot event message configuration function.

For example, according to the embodiment of the present invention, for each of access paths to the artificial intelligence service, a bridge code block such as that shown in FIG. 13 may be generated.

Referring to FIG. 13, a bridge code block 1300 may include a topic reception module setup code block 1310, a topic transmission module setup code block 1320, a message-processing callback function code block 1330, and a robot event message configuration code block 1340.

The topic reception module setup code block 1310 may be generated using the data type of the message to be received, the topic name of the message to be received, and the name of a message-processing callback function, which are fetched from the utilization target topic setup area 420 to correspond to each of topics used in the mapping rule 441 for each component of the service request message illustrated in FIG. 4. Here, the name of the message-processing callback function may be designated to have a unique name in the corresponding code.

The topic transmission module setup code block 1320 may be generated using the data type of the message to be sent and the topic name of the message to be sent, which are fetched from the utilization target topic setup area 420, to correspond to each of the target topics 460 set in the mapping rule 442 for each component of the robot event message illustrated in FIG. 4.

The message-processing callback function code block 1330 may be generated for each of message-processing callback function names set in the topic reception module setup code block 1310.

Here, the message-processing callback function code block 1330 may include a path parameter setup code block 1331, a data parameter setup code block 1332, a service request message generation code block 1333, and a service request message header code block 1334.

If it is found that a variable having the value set in the path component mapping rule 451 is present among variables detected in the settings of the artificial intelligence service access path 440 illustrated in FIG. 4, the path parameter setup code block 1331 may be generated using the corresponding value. Further, if it is found that no variable having the value set in the path component mapping rule 451 is present among variables detected in the set values of the artificial intelligence service access path 440, the path parameter setup code block 1331 may be generated by fetching system settings.

The data parameter setup code block 1332 may be generated to set respective components of the message body of the service request message from a variable (e.g., {Value}), a constant (e.g., "12"), or a component (e.g., my_request_topic.b) of the robot device message, which is set in the "from" field, among pieces of information set in the message data mapping rule 452, illustrated in FIG. 4.

The service request message generation code block 1333 may be generated to create a message module, including a value corresponding to a path and a message body, by setting the value of "url" as the value of the artificial intelligence service access path 440 illustrated in FIG. 4, and by utilizing previously set path parameter settings and data parameter settings.

The service request message header code block 1334 may be generated to set a header value utilized for each message transfer protocol in the message module and to set each of the components of the message body of the service request message from the variable (e.g., {Value}), a constant (e.g., "12"), or a component (e.g., my_request_topic.b) of the robot device message, which is set in the "from" field, with respect to header variables set in the "name" field in the header component mapping rule 450, illustrated in FIG. 4.

The robot event message configuration code block 1340 may generate a data module (e.g., outData) corresponding to the data type of the message to be received, which is fetched from the utilization target topic setup area 220, for the topic set as the target topic 460 of the robot event message illustrated in FIG. 4. Further, the robot event message configuration code block 1340 may map each component of a service result message to the corresponding component of the data module based on the target topic mapping rule 461, and may send a completed robot event message to the robot.

By means of such an automated communication method, a communication configuration between an artificial intelligence service provided in the form of a web service and robot application software using a dedicated protocol may be automated without causing a robot AI developer or a robot application software developer to develop separate code, merely by establishing a simple mapping rule between a device information message from a robot and a web service parameter.

Further, communication between a robot and an artificial intelligence service may be configured at low costs even when variation occurs in a robot driving environment or a robot development environment.

Figure 16:
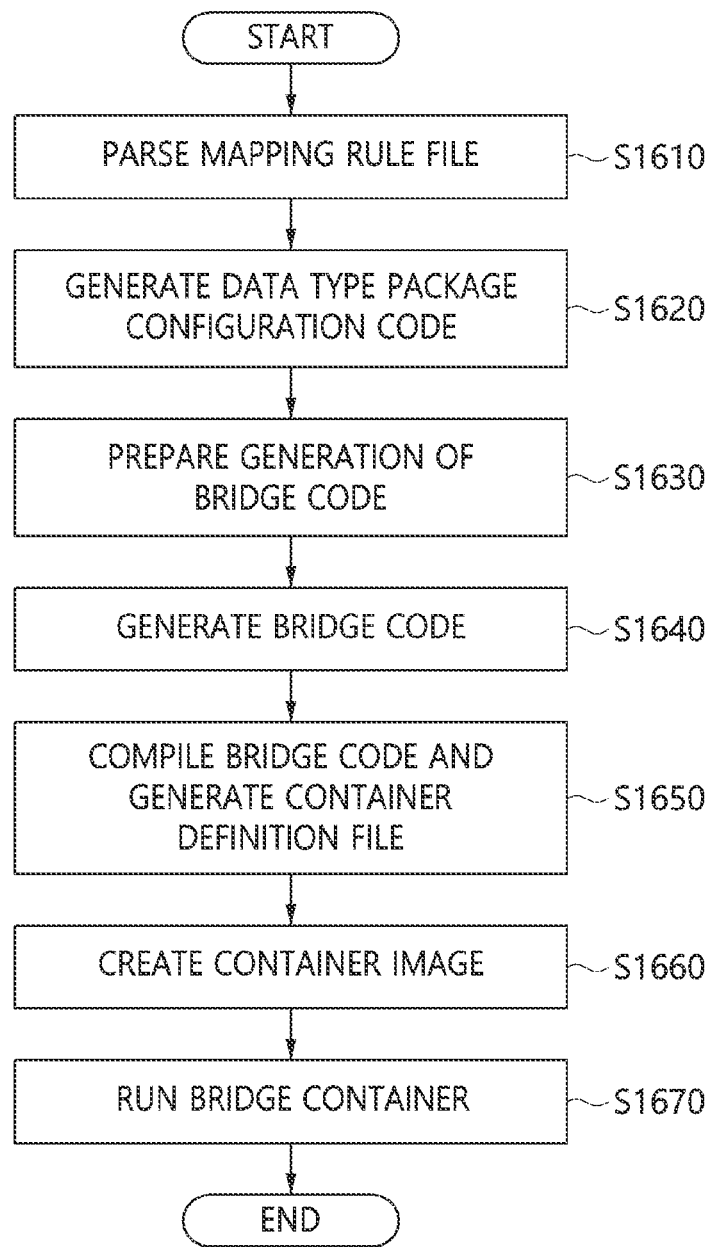
FIG. 16 is an operation flowchart illustrating in detail a process for running a bridge container in an automated communication method according to an embodiment of the present invention.

FIG. 16 is an operation flowchart illustrating in detail a process for running a bridge container in an automated communication method according to an embodiment of the present invention.

Referring to FIG. 16, the process for running a bridge container in the automated communication method according to an embodiment of the present invention may first parse a mapping rule file (mapping file) at step S1610.

For example, the mapping rule may be parsed using a YAML loader, a JSON loader, an XML loader, or the like depending on the file format of the mapping rule file, and a temporary storage directory in which bridge code, type data, and container code, which are generated based on the parsed mapping rule, are to be stored may be set.

Therefore, data type package configuration code may be generated to correspond to a topic included in a utilization target topic setup area at step S1620.

For example, settings for respective topics, which are included in the utilization target topic setup area, may be acquired through parsing. Thereafter, the name of a data type package and the location of a data type definition file may be acquired from the acquired settings, and then the data type definition file may be copied and stored in accordance with the directory structure of the data type package.

Thereafter, generation of bridge code may be prepared at step S1630.

For example, in the temporary storage directory (e.g., temp), the directory (e.g., /temp/build/src) in which the bridge code is to be stored may be set up in accordance with a bridge code directory structure, and optional files for respective code languages required to execute the bridge code (in the case of Python, setup.cfg, setup.py, _init_.py, or the like) may be generated. Thereafter, a bridge code package profile in which data type packages for respective topics included in the utilization target topic setup area are set as execution-dependency package information may be generated.

Thereafter, a bridge code block may be generated for each access path to the artificial intelligence service at step S1640.

In this case, the bridge code block may include a topic reception module setup code block, a topic transmission module setup code block, a message-processing callback function code block, and a robot event message configuration code block.

Thereafter, a container definition file may be generated at step S1650.

Here, the container definition file may include a command for adding the structure of a temporary storage directory including bridge code and data type package configuration code to a container image, a compile command for compiling data package configuration code and bridge code, and a command for automatically executing the bridge code upon running the bridge container.

Thereafter, the container image may be created at step S1660.

For example, building of the container image may be requested by inputting a container definition file to a container build tool.

Then, the bridge container may run by executing the container image at step S1670.

Here, when an error has not occurred in building the container image, running of the bridge container may be requested by inputting the name of the image used to build the container image.

Figure 17:
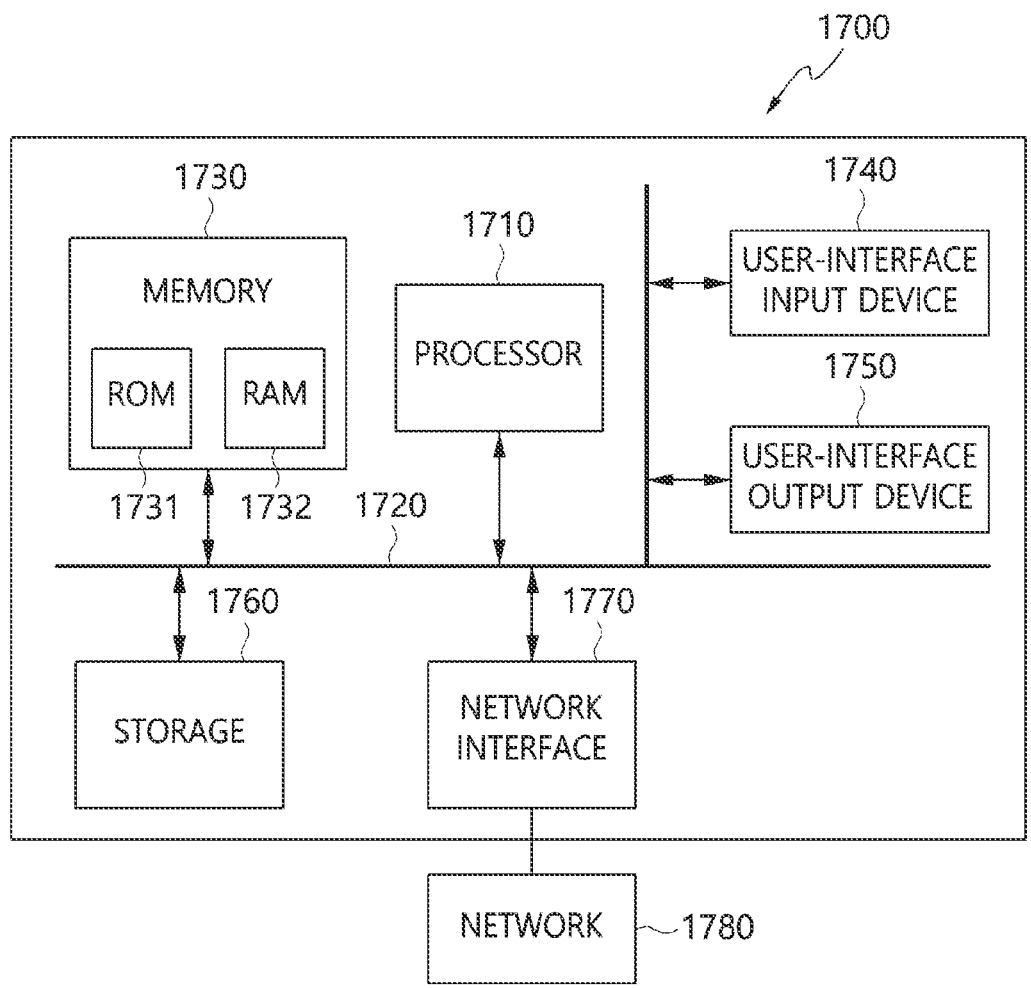
FIG. 17 is a diagram illustrating an apparatus for automated communication between a robot and an artificial intelligence service according to an embodiment of the present invention.

FIG. 17 is a diagram illustrating an apparatus for automated communication between a robot and an artificial intelligence service according to an embodiment of the present invention.

Referring to FIG. 17, the apparatus for automated communication between a robot and an artificial intelligence service according to the embodiment of the present invention may be implemented to correspond to a computer system 1700 such as a computer-readable storage medium. As illustrated in FIG. 17, a computer system 1700 may include one or more processors 1710, memory 1730, a user interface input device 1740, a user interface output device 1750, and storage 1760, which communicate with each other through a bus 1720. The computer system 1700 may further include a network interface 1770 connected to a network 1780. Each processor 1710 may be a Central Processing Unit (CPU) or a semiconductor device for executing processing instructions stored in the memory 1730 or the storage 1760. Each of the memory 1730 and the storage 1760 may be any of various types of volatile or nonvolatile storage media. For example, the memory 1730 may include Read-Only Memory (ROM) 1731 or Random Access Memory (RAM) 1732.

Accordingly, an embodiment of the present invention may be implemented as a non-transitory computer-readable storage medium in which methods implemented using a computer or instructions executable in a computer are recorded. When the computer-readable instructions are executed by the processor, the computer-readable instructions may perform a method according to at least one aspect of the present invention.

The processor 1710 may generate bridge code and a container definition file based on a mapping rule defined between the robot and the artificial intelligence service.

Here, the mapping rule may be established in consideration of Robot Operating System (ROS)-based robot application software message information and web-based artificial intelligence service information.

Here, the mapping rule may include a mapping type setup area, a utilization target topic setup area, and a service mapping rule area.

Here, a data type package corresponding to a topic included in the utilization target topic setup area may be acquired by parsing the mapping rule.

Here, a bridge code package profile may be generated by setting the data type package to execution-dependency package information.

Here, a bridge code block corresponding to the bridge code may be generated based on the bridge code package profile.

Here, robot application software message information may include message configuration information and a data structure definition file, and artificial intelligence service information may include service path information, request header parameter information, request body parameter information, and response information.

Here, the container definition file may be generated by inputting the mapping rule to a container build tool, and may include the bridge code together with the environment for compiling and executing the bridge code.

Further, the processor 1710 runs a bridge container having an independent format based on the container definition file.

Here, a container image may be built by inputting the container definition file to a Docker based on the container build tool, and running of the bridge container may be requested by executing the built container image.

Further, the processor 1710 may run the bridge code through the bridge container.

Here, the bridge code may generate a service request message to be sent to the artificial intelligence service in accordance with a service requested by a robot device message, and may generate a robot event message to be sent to the robot based on a service result message received from the artificial intelligence service.

Here, the bridge code block may perform message exchange between the robot and the artificial intelligence service based on a topic reception module setup function, a topic transmission module setup function, a message-processing callback function, and a robot event message configuration function.

Further, the processor 1710 provides an automated communication environment by exchanging messages between the robot and the artificial intelligence service based on the bridge code.

The memory 1730 stores the mapping rules.

Further, the memory 1730 stores various types of information generated by the automated communication apparatus according to the embodiment of the present invention, as described above.

In an embodiment, the memory 1730 may be configured independently from the automated communication apparatus in order to support functions for automated communication between the robot and the artificial intelligence service. Here, the memory 1730 may function as separate large-capacity storage, or may include a control function for performing operations.

Meanwhile, the apparatus for automated communication between the robot and the artificial intelligence service may include memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

By means of such an automated communication apparatus, a communication configuration between an artificial intelligence service provided in the form of a web service and robot application software using a dedicated protocol may be automated without causing a robot AI developer or a robot application software developer to develop separate code, merely by establishing a simple mapping rule between a device information message from a robot and a web service parameter.

Further, communication between a robot and an artificial intelligence service may be configured at low costs even when variation occurs in a robot driving environment or a robot development environment.

In accordance with the present invention, a communication configuration between an artificial intelligence service provided in the form of a web service and robot application software using a dedicated protocol may be automated without causing a robot AI developer or a robot application software developer to develop separate code, only by establishing a simple mapping rule between a device information message from a robot and a web service parameter.

Further, the present invention may provide a scheme for configuring communication between a robot and an artificial intelligence service at low costs even when variation occurs in a robot driving environment or a robot development environment.

As described above, in the apparatus for automated communication between a robot and an artificial intelligence service and the method using the apparatus according to the present invention, the configurations and schemes in the above-described embodiments are not limitedly applied, and some or all of the above embodiments can be selectively combined and configured such that various modifications are possible.

What is claimed is:

1. A method for automated communication between a robot and an artificial intelligence service, the method being performed by an apparatus for automated communication between the robot and the artificial intelligence service, the method comprising:
generating bridge code and a container definition file based on a mapping rule defined between the robot and the artificial intelligence service;
running a bridge container having an independent format based on the container definition file;
executing the bridge code through the bridge container; and providing an automated communication environment by exchanging a message between the robot and the artificial intelligence service based on the bridge code.

2. The method of claim 1, wherein the bridge code generates a service request message to be sent to the artificial intelligence service in accordance with a service requested by a robot device message, and generates a robot event message to be sent to the robot based on a service result message received from the artificial intelligence service.

3. The method of claim 1, wherein the mapping rule is established in consideration of Robot Operating System (ROS)-based robot application software message information and web-based artificial intelligence service information.

4. The method of claim 3, wherein:
the robot application software message information includes message configuration information and a data structure definition file, and
the artificial intelligence service information includes service path information, request header parameter information, request body parameter information, and response information.

5. The method of claim 1, wherein the mapping rule includes a mapping type setup area, a utilization target topic setup area, and a service mapping rule area.

6. The method of claim 5, wherein generating the bridge code comprises:
acquiring a data type package corresponding to a topic included in the utilization target topic setup area by parsing the mapping rule;
generating a bridge code package profile by setting the data type package to execution-dependency package information; and
generating a bridge code block corresponding to the bridge code based on the bridge code package profile.

7. The method of claim 6, wherein the bridge code block performs message exchange between the robot and the artificial intelligence service based on a topic reception module setup function, a topic transmission module setup function, a message-processing callback function, and a robot event message configuration function.

8. The method of claim 1, wherein running the bridge container comprises:
building a container image by inputting the container definition file to a Docker based on a container build tool; and
requesting running of the bridge container by executing the built container image.

9. The method of claim 8, wherein the container definition file is generated by inputting the mapping rule to the container build tool, and includes an environment for compiling and executing the bridge code, together with the bridge code.

10. An apparatus for automated communication between a robot and an artificial intelligence service, comprising:
a processor for generating bridge code and a container definition file based on a mapping rule defined between the robot and the artificial intelligence service, running a bridge container having an independent format based on the container definition file, executing the bridge code through the bridge container, and providing an automated communication environment by exchanging a message between the robot and the artificial intelligence service based on the bridge code; and
a memory for storing the mapping rule.

11. The apparatus of claim 10, wherein the bridge code generates a service request message to be sent to the artificial intelligence service in accordance with a service requested by a robot device message, and generates a robot event message to be sent to the robot based on a service result message received from the artificial intelligence service.

12. The apparatus of claim 10, wherein the mapping rule is established in consideration of Robot Operating System (ROS)-based robot application software message information and web-based artificial intelligence service information.

13. The apparatus of claim 12, wherein:
the robot application software message information includes message configuration information and a data structure definition file, and
the artificial intelligence service information includes service path information, request header parameter information, request body parameter information, and response information.

14. The apparatus of claim 10, wherein the mapping rule includes a mapping type setup area, a utilization target topic setup area, and a service mapping rule area.

15. The apparatus of claim 14, wherein the processor acquires a data type package corresponding to a topic included in the utilization target topic setup area by parsing the mapping rule, generates a bridge code package profile by setting the data type package to execution-dependency package information, and generates a bridge code block corresponding to the bridge code based on the bridge code package profile.

16. The apparatus of claim 15, wherein the bridge code block performs message exchange between the robot and the artificial intelligence service based on a topic reception module setup function, a topic transmission module setup function, a message-processing callback function, and a robot event message configuration function.

17. The apparatus of claim 10, wherein the processor builds a container image by inputting the container definition file to a Docker based on a container build tool, and requests running of the bridge container by executing the built container image.

18. The apparatus of claim 17, wherein the container definition file is generated by inputting the mapping rule to the container build tool, and includes an environment for compiling and executing the bridge code, together with the bridge code.

* * * * *